E. R. HALL.
Horse Hay Rake.
No. 57,706. Patented Sept. 4, 1866.
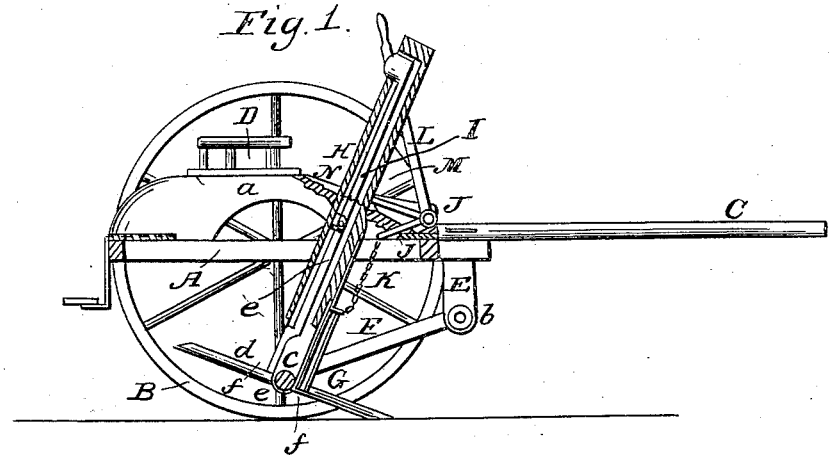
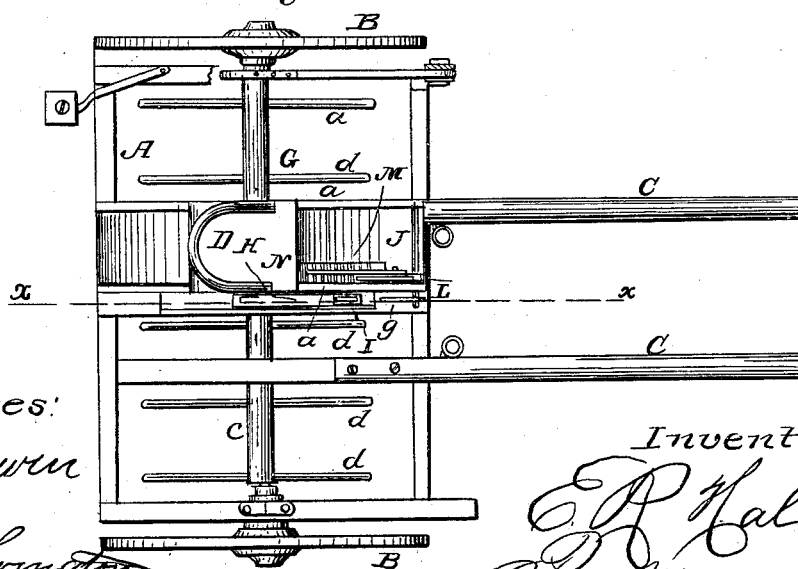

UNITED STATES PATENT OFFICE.

E. R. HALL, OF ILION, NEW YORK.

IMPROVEMENT IN HORSE-RAKES.

Specification forming part of Letters Patent No. 57,706, dated September 4, 1866.

*To all whom it may concern:*

Be it known that I, E. R. HALL, of Ilion, Herkimer county, and State of New York, have invented a new and Improved Horse-Rake; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line $x$ $x$, Fig. 2; Fig. 2, a plan or top view of the same.

Similar letters of reference indicate like parts.

This invention relates to a new and improved horse-rake of that class in which wooden teeth are employed; and it consists in a novel manner of hanging and arranging the rake, whereby the same is put under the complete control of the driver and rendered capable of being raised and lowered and turned in order to discharge its load with the greatest facility.

A represents a rectangular frame, which is mounted on two wheels, B B, and has thills C attached to it.

D is the driver's seat, placed upon parallel bars or supports $a$ $a$, secured longitudinally on the frame A.

To the front end of the frame A, at each side, there is attached a pendant, E, in the lower ends of which the front ends of bars F are secured by pivots $b$. These bars F F are allowed to swing freely on the pivots $b$ $b$, and between the rear ends of the bars F F the rake G is fitted. This rake G is composed of a head, $c$, provided with journals at its ends, which pass loosely through the bars F F, to admit of the rake turning freely, the head $c$ having wooden teeth $d$ passing through it at right angles, and projecting from it at equal distances from opposite sides, as shown in both figures.

H represents an arm, the lower end of which is connected by a metallic strap, $e$, with the center of the rake-head $c$, said strap passing around a sunken cylindrical portion made in the rake-head.

The arm H is tubular, and it has a lever, I, fitted within it and working on a fulcrum-pin, $d^\times$, (see Fig. 1,) said lever having a spring, $e$, bearing against it, which spring has a tendency to keep the lower end of the lever in contact with the rake-head; and the rake-head has two pins, $f$ $f$, driven in it at opposite points, either of which bears against the lower end of lever I when the rake is at work.

In the front parts of the supports $a$ $a$, on which the driver's seat D is placed, there is placed transversely a shaft, J, having an arm, $g$, at one end, which is connected by a chain, K, with the lower part of the arm H. This shaft J has a lever, L, attached to it, which extends upward in front of the driver's seat D, and has a pawl, M, attached to it, which engages with a rack, N, secured to a board on the front part of the supports $a$ $a$ of the driver's seat.

By adjusting this lever L the arm H, and consequently the rake G, may be raised and lowered as desired. It is raised temporarily in order to pass over obstructions, and is held suspended above the surface of the ground when the device is being drawn from place to place.

When the rake is at work it is slightly inclined, as shown in Fig. 1, and when the rake has gathered up its load the upper end of lever I, within the arm H, is pressed forward, which causes the lower end of said lever to move off beyond the pin $f$, and the rake will then make a half-revolution and discharge its load, the rake being stopped when the half-revolution is completed, on account of the other pin $f$ coming in contact with the lower end of lever I.

This rake may be constructed at a moderate expense, and it will operate well, the rake being under the complete control of the driver.

Having thus described my invention, I claim as new and desire to secure by Letters Patent—

1. The suspending or fitting of the rake G between swinging bars F F, connected to the front end of the frame A, and having an arm, H, connected with the rake-head, substantially as and for the purpose set forth.

2. The lever I, fitted within the arm H, in connection with the pins $f$ $f$ on the rake-head $c$, when said parts are applied to a suspended rake, G, substantially as and for the purpose specified.

3. The lever L on the axis J, provided with the arm $g$, connected with the arm H by a chain, K, in combination with the pawl M, attached to lever L, and the rack N, secured to a board on the front part of the seat-supports $a\ a$, substantially as and for the purpose specified.

The above specification of my invention signed by me this 21st day of March, 1866.

E. R. HALL.

Witnesses:
WM. F. MCNAMARA,
ALBERT W. BROWN.